United States Patent [19]

Hildebrandt

[11] Patent Number: 4,789,956
[45] Date of Patent: Dec. 6, 1988

[54] MAXIMUM NEGATIVE NUMBER DETECTOR

[75] Inventor: Eric A. Hildebrandt, Santa Clara, Calif.

[73] Assignee: Harris Corp., Melbourne, Fla.

[21] Appl. No.: 788,054

[22] Filed: Oct. 16, 1985

[51] Int. Cl.⁴ .............................................. G06F 7/38
[52] U.S. Cl. .................. 364/736.5; 364/748; 364/715.04
[58] Field of Search ........ 364/715, 748, 200 MS File, 364/900 MS File

[56] References Cited

U.S. PATENT DOCUMENTS

| | | | |
|---|---|---|---|
| 3,831,012 | 8/1974 | Tate et al. | 364/748 |
| 4,166,271 | 8/1979 | Thirlwall | 364/715 |
| 4,539,549 | 9/1985 | Hong et al. | 364/715 |

Primary Examiner—Gary V. Harkcom
Assistant Examiner—Dale M. Shaw
Attorney, Agent, or Firm—Antonelli, Terry & Wands

[57] ABSTRACT

Prior to normalizing floating point number, a maximum negative number detector is employed. In order to determine whether a number is a maximum negative number, the inventive scheme examines the left-most (most significant) bit of the bit sequence to be scaled is examined. For positive numbers (where the bit is a zero) the normalize count is carried out without modification. Upon encountering a negative number the bits of the number are examined. The maximum negative number detector contains logic circuitry that counts the displacement from the left-most bit position to the location of the first zero bit from that position. It also counts the displacement from the right-most bit position to the location of the first one bit from that position. For a maximum negative number (one or more ones followed only by one or more zeros) these two counts will differ by a single bit. This value is then used to prescale the normalization counter so that normalization may proceed.

35 Claims, 2 Drawing Sheets

| BYTE 0 | BYTE 1 | BYTE 2 | | BYTE 7 |
|---|---|---|---|---|
| 01234567 | 01234567 | 01234567 | ... | 01234567 |
| 11111111 | 10000000 | 00000000 | ... | 00000000 |

LOCATE FIRST "0" FROM THE LEFT

LOCATE FIRST "ONE" FROM THE RIGHT

| BYTE 0 | BYTE 1 | BYTE 2 | | BYTE 7 |
|---|---|---|---|---|
| 01234567 | 01234567 | 01234567 | ... | 01234567 |
| 00000000 | 01111111 | 11111111 | ... | 11111111 |

| BYTE 0 | BYTE 1 | BYTE 2 | | BYTE 7 |
|---|---|---|---|---|
| 01234567 | 01234567 | 01234567 | ... | 01234567 |
| 11111111 | 00000000 | 00000000 | ... | 00000000 |

MAXIMUM NEGATIVE NUMBER DETECTOR

FIELD OF THE INVENTION

The present invention relates in general to data processing apparatus and is particularly directed to a maximum negative number detector for use with a mantissa normalization circuit.

BACKGROUND OF THE INVENTION

Customary encoding or numerical value representation in present day data processing apparatus adopt a binary representation in which the left-most bit of a given sequence is the sign bit and all bits to the right of the sign bit correspond to the operand. It is a generally employed practice that the sign bit be a zero for a positive number and a one for a negative number, with the remaining digits indicating the presence of absence of powers of two.

In order to carry out (floating point) arithmetic operations within the processor, it is necessary to normalize or scale the operands of the numbers to be processed. Examples of floating point control networks including associated normalization circuits are described in the U.S. Pat. Nos. to Tate et al 3,831,012, Voltin 3,193,669, Alrich et al 3,022,006, Hertz 3,304,417 and Marette 3,198,938. For positive numbers scaling is usually effected by counting (through a left shift process) the number of places (zeros) to the right of the left most bit until a one is encountered. Typically a counter within the normalizer circuit is incremented for each shift so as to provide a measure of the scale factor. For negative numbers, expressed in binary one's complement notation, the zeros represent significant digits and, after complementing the number, the same process described above for positive numbers is carried out to accomplish the normalizing. Namely the same normalization circuit can be used for both positive and negative numbers (with negative numbers being complemented prior to scaling). If, however, the number to be normalized is a maximum negative number (namely, one which cannot be represented as a positive number in the same precision), the value of the scale factor in the normalization counter will be in error. Conventionally, when a maximum negative number is encountered, correction for the above error is an after-the-fact exercise, requiring extra cycles of processing time during which renormalization of the maximum negative number is carried out.

SUMMARY OF THE INVENTION

In accordance with the present invention, there is provided, as part of the normalization circuit, a scheme for examining each number to be normalized and for providing an indication of the presence of a maximum negative number, prior to the actual normalization operation. For positive and ordinary negative numbers, the downstream scaling circuitry is permitted to operate in normal fashion. For a maximum negative number, the detection scheme affords a correction of the scaling counter prior to normalization, thereby enhancing processing speed.

In order to determine whether a number is a maximum negative number, the inventive scheme examines the left-most (most significant) bit of the bit sequence to be scaled. For positive numbers (where the bit is a zero) the normalize count is carried out without modification. Upon encountering a negative number the bits of the number are examined. Specifically, the detector contains logic circuitry that counts the displacement from the left-most bit position to the location of the first zero bit from that position. It also counts the displacement from the right-most bit position to the location of the first one bit from that position. For a maximum negative number (one or more ones followed only by one or more zeros) these two counts will differ by a single bit. This value is then used to prescale the normalization counter so that normalization may proceed.

DETAILED DESCRIPTION

Figures 1, 2, 4, 5:
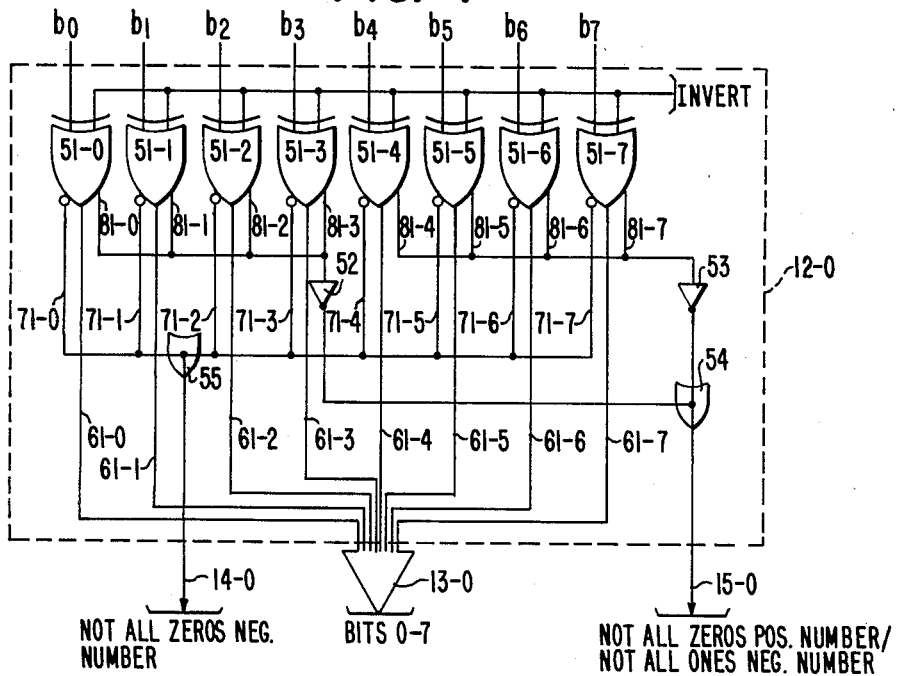
FIG. 1 illustrates an example of a sixty-four bit (eight byte) maximum negative number bit sequence.
FIG. 2 shows the complement of the sequence of FIG. 1.
FIG. 4 shows the details of an individual stage of the controlled inversion logic unit 12 of FIG. 1.
FIG. 5 illustrates an additional example of a sixty-four bit maximum negative number.

Before describing, in detail, the particular improved maximum negative number detection scheme in accordance with the present invention, it should be observed that the present invention resides primarily in a novel structure combination of conventional computer logic circuits and not in the particular detailed configurations thereof. Accordingly, the structure, control, and arrangement of such logic circuits have been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. In addition, various components of an electronic data processing system have been appropriately consolidated and simplified in order to emphasize those portions that are most pertinent to the present invention. Thus, the block diagram illustrations of the Figures do not necessarily represent the mechanical structural arrangement of the exemplary system, but are primarily intended to illustrate the major structural components of the system in a convenient functional grouping, whereby the present invention can be more readily understood.

As pointed out briefly above, the detection scheme in accordance with the present invention examines each number (binary sequence) to be normalized. Positive numbers are passed through the detector without modification; however, negative numbers are examined to determine whether the number is a maximum negative number (which cannot be represented as a positive number in the same precision). Another way of defining a maximum negative number is a binary sequence that consists of one or more consecutive one bits (beginning with the most significant bit position) followed only by one or more consecutive zeros. For example, the maximum negative number 100(−4) cannot be represented as a positive number in the same precision as can the sequence of bits 011(+3), which is a maximum positive number with three bits.

For purposes of describing the present invention, the environment will be assumed to be a sixty-four bit (eight byte) processor. An example of a sixty-four bit (eight byte) maximum negative number to be used for explaining the present invention in the detailed description below is shown in FIG. 1. In the example chosen, the maximum negative number consists of nine one bits followed by fifty-five consecutive zeros. In accordance with the present invention, in order to determine whether or not a number is a maximum negative number, the detection scheme operates in response to the detection of a one bit in the most significant bit position, namely bit position zero, in byte zero (byte zero being the most significant byte and byte seven being the least significant byte) and proceeds to look for the first zero that may be encountered. Another way of describing this operation is the fact that the present invention operates to locate the first zero from the left most bit position. As shown in FIG. 1, the first zero occurs in byte position one in the second byte (byte 1).

In addition to locating the position of this first zero, from the left, the present invention operates to locate the first one from the right; namely the invention begins with the least significant bit position (bit position seven of byte seven) and procedes leftward from that position until it encounters a one bit. If the bit sequence defines a maximum negative number, that one bit position will always be one bit position greater than the bit position at which the first zero from the left is encountered. In the example shown, the first one occurs at bit position zero of byte number one, namely the ninth most significant bit position of the sixty-four bit sequence, while the first zero occurs in the tenth most significant bit position of the sixty-four bit sequence. For numbers other than maximum negative numbers, this relationship will not hold, so that it is simply a matter of locating the first zero bit from the left and the first one bit from the right and comparing the bit positions of these bits. For a maximum negative number, the location of the one bit position will always occur one significant bit position greater than the zero bit position.

In accordance with the implementation of the invention, the location of the first zero from the left and the first one from the right is effectively carried out in the same manner, by locating the position of the first one following a sequence of zero bits. This is partially illustrated in FIG. 2 which shows a bit sequence that is the complement of the bit sequence of FIG. 1. By inverting the sequence of FIG. 1, the location of the first zero bit from the left of FIG. 1 is equivalent to locating the first one bit from the left in FIG. 2. In effect, the invention operates to detect the first one bit following a sequence of zeros, as pointed out above, by locating the first one bit in the sequence of FIG. 2 following the zeros from the left and the first one bit in a sequence of FIG. 1 following the zeros from the right. The manner in which the invention accomplishes this will be explained below with reference to FIGS. 3 and 4.

Figure 3:
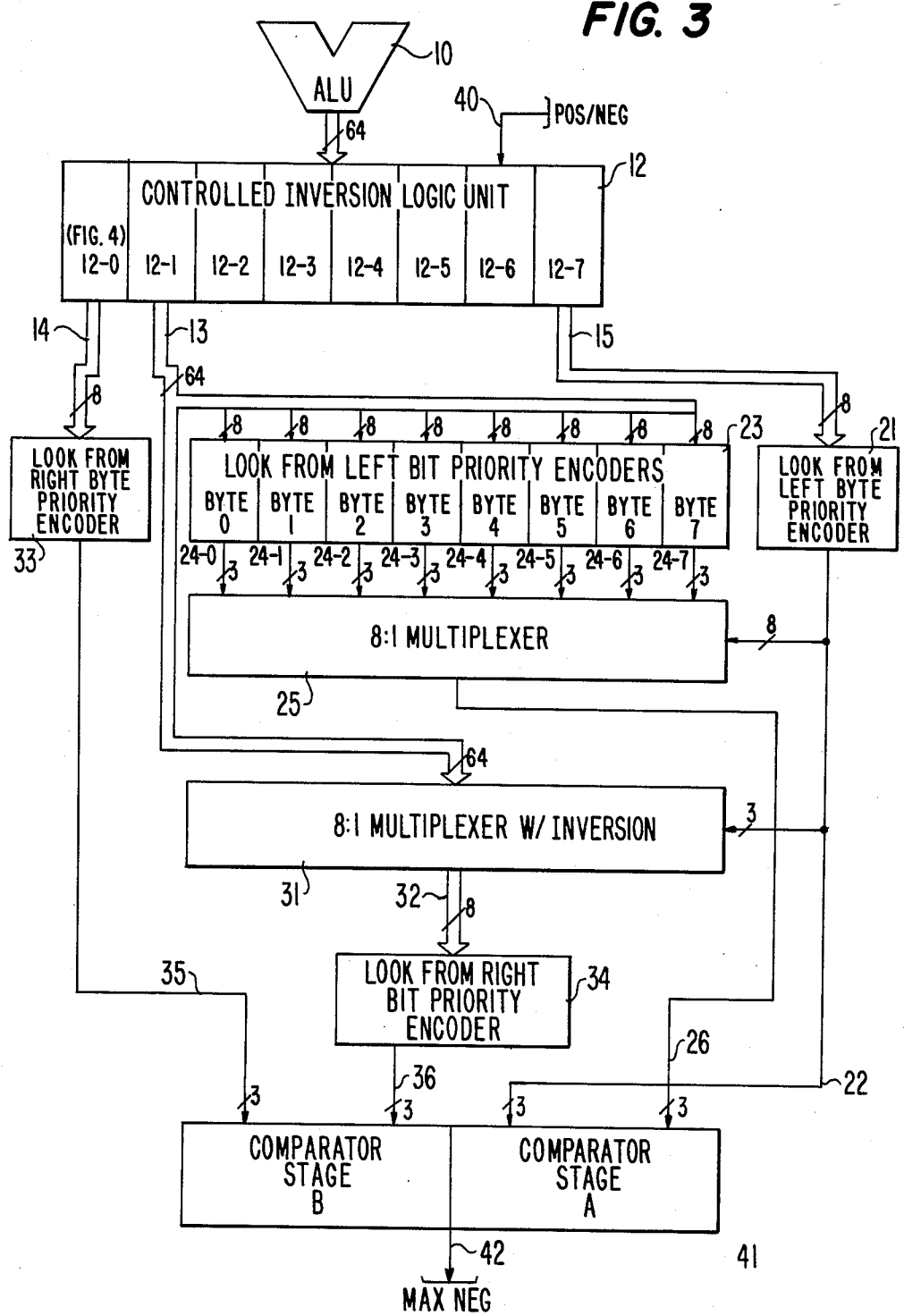
FIG. 3 is a schematic block diagram of a maximum number detector.

Referring now to FIG. 3, there is shown a block diagram of the maximum negative number detector of the present invention. This maximum negative number detector is employed at the front end of a normalizer circuit which receives numbers to be normalized from upstream processing circuitry such as an arithmetic logic unit (ALU)10. Since, according to the present example, the environment of the processor is assumed to be a sixty-four bit machine, the output of the ALU is shown as being coupled over link 11 to supply a sixty-four bit (eight byte) sequence to a controlled inversion logic unit 12. Controlled inversion logic unit 12 consists of a set of eight individual logic units 12-0 . . . 12-7 (associated with bytes 0-7 of the sixty-four bit sequence), an individual one of which, unit 12-0 (associated with the most significant bytes, byte 0), is shown in FIG. 4. As shown therein, each controlled inversion logic unit has eight inputs b0 . . . b7 (the eight bits of the byte of interest) which are coupled to respective exclusive-OR gates 51-0 . . . 51-7. Another input of each of the exclusive OR gates is coupled to an invert control line 40. This line is used to selectively invert the state of each of the lines b0 . . . b7 when the output of ALU 10 is a negative number. Each exclusive OR gate has three outputs. A first output from the gates is respectively coupled over links 61-0 . . . 61-7 to a link 13-1 which represents the result of the exclusive-OR operation as controlled by the invert line 40. For a negative number, this means that link 13-1 contains the complement or inverse of bits b0-b7 on its respective bit lines. A second output of each of gates 51-0 . . . 51-3 is (respectively) coupled over one of links 81-0 . . . 81-3 to an inverter 52. Similarly, a second output of each of gates 51-4 . . . 51-7 is coupled over respective links 81-4 . . . 81-7 to an inverter 53. The outputs of inverters 52 and 53 are wire ORed at 54 to an output link 15-1. The state of link 15-1 will represent whether or not any of the bits b0-b7 is a one for a positive number or is a zero for a negative number. This is identified as a not-all-zeros positive number or a not all ones negative number representative link.

Another output of each of the exclusive-OR gates 51-0 . . . 51-7 is inverted and coupled over respective links 71-0 . . . 71-7 and wire-ORed to an output link 14-1 at 55. Namely, the state of line 14-1 is the inverse of line 15-1 and represents whether or not any of the gates has produced a one bit for a negative number. This is identified as a not-all-zeros negative number representative link in FIG. 4.

Referring again to FIG. 3, each of the respective logic unit stages 12-0 . . . 12-7 contains a controlled inversion logic unit as shown in FIG. 4 for each of the respective bits (bit 0 . . . bit7) of the bytes 0-7 with which the stages 12-0 . . . 12-7 are respectively associated. Thus, controlled inversion logic unit 12 has a sixty-four bit output link 13 containing the output links 13-1 . . . 13-7 for each of the respective stages, such as the stage 12-0 shown in FIG. 4; an eight bit output link 14, containing a set of output links 14-0 . . . 14-7 for the not-all-zeros negative number line, an individual one 14-0 of which is shown in FIG. 4; and an eight bit output link 15, representing not-all-zeros for positive number and not-all-ones for a negative number, such as the link 15-0 for the stage 12-0 shown in FIG. 4, described above.

As explained above with reference to FIG. 1, the present invention operates to determine whether a negative number is a maximum negative number. For a positive number, the contents of link 64 are essentially passed directly to downstream normalizing circuitry without modification by the circuit of FIG. 3 so an explanation of that operation will not be described here. When the output of ALU 10 is a negative number, however, which is the case under investigation here, the state of invert line 40 on each of the inversion logic units will cause the bit sequence supplied over link 11 to be inverted and coupled to output link 13. Namely, using the example shown in FIG. 1, output link 13 will produce the sixty-four bit sequence shown in FIG. 2. This sixty-four bit sequence is coupled to a look-from-left bit priority encoder unit 23. Unit 23 contains eight priority encoder stages respectively associates with bytes 0-7 that are coupled over link 13. Each priority encoder stage is comprised of conventional combinational logic which operates to detect the most significant bit position of any "one" bit in the byte that is applied to it. The location in the byte is identified as a three bit code on a respective one of output links 24-0 . . . 24-7. For the bit sequence shown in FIG. 2, there are no "one" bits in byte zero so that the output code on link 24-0 will be 000. For the second byte (byte 1) the seven bit sequence contains at least one 1 bit (here seven 1 bits) and the location of the most significant bit position of the first "one" bit is bit position number 1. Accordingly, link 24-1 will produce the binary code 001. The remaining bytes 2-7 contain no one bits so all of their output links 24-2 . . . 24-7 are all zeros. Links 24-0 . . . 24-7 are coupled to an 8:1 multiplexer 25. Multiplexer 25 is controlled by a select signal on link 22 to couple the 3 bits on one of input links 24-0 . . . 24-7 to a three bit output link 26.

The three bit control link 22 is coupled to the output of a look-from-the-left byte priority encoder 21, the input of which is coupled to output link 15 from controlled inversion logic unit 12. As described above, link 15 couples links 15-0 . . . 15-1 from each of the respective stages 12-0 . . . 12-7 of controlled inversion logic unit to supply an indication of whether or not the byte applied to each respective controlled logic unit stage contains all "ones" (for a negative number). In the example under consideration, FIG. 1 illustrates that byte 0 contains all ones. The first byte that contains a zero, beginning from the left or most significant bit position of the sixty-four bit sequence is byte one. Priority encoder 21, like each of the stages of priority encoder unit 23, contains combinational logic to provide an indication of which of the eight input lines coupled to it contains the first zero. Because of the inversion carried out by the exclusive-OR gates within the inversion logic unit 12, this effectively means that priority encoder 21 locates the first byte from the left that contains a one bit. As shown in FIG. 2, which represents the inversion of the sequence of FIG. 1, this byte will be byte number one (in which the first one occurs at bit position number one). Thus, the state of output link 22 from encoder 21 is a three bit sequence into which the eight bit input link 15 has been encoded and contains the value (001) identifying byte number one.

As pointed out above, this code is supplied to the control input or multiplexer 25 and it is also supplied to a further multiplexer 31 and a comparator 41, the operation of which will be described below. In effect, the three bit sequence on link 22 identifies the fact that the first one bit in the sequence shown in FIG. 2 occurs within byte 1 and it instructs multiplexer 25 to couple the code on link 24-1, which specifies the exact bit position within byte one whereat the first one bit occurred, to output link 26.

Output link 26 is coupled with output link 22 from encoder 21 as inputs to a stage A of a comparator circuit 41. In effect, link 22 is a three bit code locating the byte in which the first one bit from the left (for the sequence shown in FIG. 2 has occurred), whereas the contents of link 26 are a three bit code identifying the actual bit position within that byte whereat the first one occurred. Thus, the code supplied to stage A of comparator 41 will be a six bit code 001001 the first three bits (the most significant three bits of this code) represent the contents of link 22 and identify the fact that the first one bit has occurred within byte one, whereas the last three bits 001 (the least significant three bits of the six bit code) identify the precise location within the byte one whereat the first one has occurred. Recapitulating, the circuitry described thus far operates to locate the first one bit from the left from the sequence shown in FIG. 2 (namely the first zero bit from the left for the actual negative number sequence shown in FIG. 1). The remaining circuitry to be described below, operates to locate the first one bit from the right for the negative number sequence shown in FIG. 1.

For this purpose, the not-all-zeros output link 14 from the controlled inversion logic unit 12 is coupled to a look from-the-right byte priority encoder 33. Like encoder 21 and the encoder stages of priority encoder unit 23, encoder 33 contains combinational logic to identify the most significant bit position of the eight bit input whereat a one first occurs. The eight bits are encoded as three bits on output link 35. For the negative number shown in FIG. 1, bytes 2-7 are all zeros whereas bytes 0 and 1 each contain at least one 1 bit. Since the purpose of the present exercise is to locate the first byte from the right which contains a 1 bit, links 14-0 . . . 14-7 of link 14 are coupled to the eight inputs of encoder 33 in an order reverse to that in which the links 13-0 . . . 13-7 and 15-0 . . . 15-7 are coupled to the stages of encoder 23 and priority encoder 21, respectively. Through this inverse connection, encoder 33 locates the first byte beginning with the least significant byte number 7 or from the right hand portion of the sequence shown in FIG. 1 and identified which byte is the first byte that contains a "one". For the negative number sequence shown in FIG. 1, the first byte containing a one from the right hand end of the bit sequence is byte number 1. Thus, encoder 33 will produce a three bit code on output link 35 representative of byte number 1. This code will correspond to the three most significant bytes of a six bit code to be applied to comparator stage B of comparator 41. This sequence corresponds to the code 001, identifying byte number 1, just as the three most significant bits of the six bit code applied to stage A applied by link 22.

To locate the precise bit position within byte 1 whereat the first one bit from the right has occurred, the logic circuitry of FIG. 3 contains a multiplexer 31 and a further priority encoder 34. Multiplexer 31 is an 8:1 multiplexer the outputs of which are inverted. The inputs of multiplexer 31 are coupled to each of the sixty-four bit lines of output link 13 from controlled inversion logic unit 12. Multiplexer 31 operates to couple the bit states of a respective one of the bytes 0-7 to an eight bit output link 32, after inverting the bit states. Selection of the appropriate byte is controlled by the state of link 22. It will be recalled that link 22 identifies which byte contains the first zero from the left for the sequence under consideration (shown in FIG. 1) or the first one from the left for the inverse of that maximum negative number (shown in FIG. 2). These three bits are chosen as the select control lines for multiplexer 31 because of the fact that for a maximum negative number the location of the first one bit from the right will always be exactly one bit position more significant than the first zero bit from the left, as shown in FIG. 1. This means that the same byte identification code for locating the first zero from the left for the maximum negative number can be used to identify that byte for locating the first one bit from the right.

More particularly, as shown in FIG. 1, the first zero bit from the left occurs within byte 1. As pointed out previously, the code identifying byte 1 is supplied over link 22 look-from-left byte priority encoder 21. The three least significant bits supplied over link 26 locate the bit position within byte 1 as being bit position number one whereat the first zero is located (or the first one is located for the inverse sequence shown in FIG. 2).

In the example chosen, it can be seen that the first one bit from the right for the maximum negative number sequence shown in FIG. 1 also occurs within byte 1, so that the same byte sequence can be employed for bit position identification. This feature of the invention also holds true even where the transition from a 1 to a 0 occurs at a boundary between bytes. If, for example, the maximum negative number under consideration were the number shown in FIG. 5, the first zero from the left is shown as occurring in byte 1, so that the three most significant bits of the six bit code supplied to comparator stage A of comparator 41 over link 22 would be the code 001. The bit position of the first 0 in that byte is the least significant bit position or the code 000 which would be supplied over link 26 to stage A of comparator 41, so that the entire six bit code supplied is the code 001000.

Now, looking from the right, the first byte to contain a one is byte 0 so that the six bit code supplied over link 35 from encoder 33 is the code 000. The byte identification code supplied over link 22 which identifies byte 1 as containing the first one from the right does not present a problem because of the inversion provided by multiplexer 31. Namely, the contents of byte 1, as examined by encoder 34, are all ones, so that the code 111 would be supplied over the least significant bit output link 36 to stage B of comparator 41. Thus, the code supplied to comparator stage B would be the code 000111 which differs from the code 001000 supplied to stage A by exactly 1 bit.

In the example under consideration, the code 001 as the three most significant bits is supplied over link 35 and the code 000 (locating bit position 0 in byte 1 as the occurrence of the first one from the right for the sequence shown in FIG. 1) is applied over link 36. Accordingly, stage B receives the six bit code 001000, whereas stage A receives the code 001001. Thus, the magnitude of the value supplied to stage A is one bit greater than the magnitude of the value supplied to stage B and comparator 41 recognizes this differential as a maximum negative number comparison and produces an output indicating the same over output link 42.

Where the number is not a maximum negative number, the first one bit encountered from the right will occur at a bit position producing a higher code supplied to stage B of comparator, 41 so that the output of comparator 41 will not produce a maximum negative number indication on output link 42.

Advantageously, because the circuitry of the present invention employs substantially the same components (each of the priority encoders is identically configured) and operates on the entire sixty-four bit sequence to carry out the look from-the-left and the look-from-the-right operations simultaneously, processing time is minimized. Moreover, because the operation occurs prior to normalization, extra cycles for renormalizing after correction are not required. In effect, the output of comparator 41 is supplied to the scaling register to offset its contents by one, taking into account what would otherwise be an erroneous shift for the maximum negative number situation. As a result, a correct normalization count is maintained for floating point processing.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use in a data processing apparatus wherein respective sequences of digital data signals representative of numerical values are to be subjected to prescribed arithmetic signal processing operations, an arrangement for analyzing said sequences of digital data signals to detect whether a sequence corresponds to a maximum negative number, wherein said maximum negative number is defined as a number having one or more of a first prescribed digital data signal, followed by one or more of a second prescribed digital data signal, comprising:

first means for examining the contents of a sequence of digital data signals to locate the first occurrence therein of a first prescribed digital data signal relative to one end of said sequence;

second means for examining the contents of said sequence of digital data signals to locate the first occurrence therein of a second prescribed digital data signal relative to the opposite end of said sequence; and third means, coupled to said first and second means, for producing an output signal identifying said sequence as corresponding to a maximum negative number in response to the location in said sequence of said first occurrence of said first prescribed digital data signal having a prescribed relationship with respect to the location in said sequence of said first occurrence of said second prescribed digital data signal.

2. An arrangement according to claim 1, wherein a sequence of digital data signals corresponds to a prescribed sequence of binary signals, a first binary state of which is represented by said first prescribed digital data signal, and a second binary state of which is represented by said second prescribed digital data signal.

3. An arrangement according to claim 2, wherein said third means comprises means for producing said output signal in response to said second means locating said first occurrence of said second prescribed digital data signal at a binary position in said sequence more significant than the binary position of said first occurrence of said first prescribed digital data signal in said sequence.

4. An arrangement according to claim 3, wherein said sequence of binary signals is comprised of a sequence of groups of binary signals and wherein said first means comprises means for locating which of said groups contains said first occurrence of said first prescribed binary signal and producing a first group identification signal representative thereof and means for locating the position of said first occurrence of said first prescribed binary signal within said which group and producing a first position identification signal representative thereof.

5. An arrangement according to claim 4, wherein said second means comprises means for locating which of said groups contains said first occurrence of said second prescribed binary signal and producing a second group identification signal representative thereof and means for locating the position of the first occurrence of said second prescribed binary signal, within that group of binary signals represented by said first group identification signal, relative to said opposite end of said sequence and producing a second position identification signal representative thereof.

6. An arrangement according to claim 5, wherein said third means comprises means for comparing said first group identification signal and said first position identification signal with said second group identification signal and said second position identification signal and producing said output signal in response to the binary position in said sequence as represented by said second group and second position identification signals being more significant than the binary position in said sequence as represented by said first group and first position identification signals.

7. An arrangement according to claim 6, wherein each of said groups corresponds to a byte of binary signals and said first and second position signals respectively identify the position of said first occurrence with said first byte.

8. An arrangement according to claim 2, wherein said sequence of binary signals is comprises of a sequence of groups of binary signals and wherein said first means comprises means for producing a first plurality of signals respectively associated with each group and each of which is representative of whether of not all the binary signals of its associated group correspond to said second binary state.

9. An arrangement according to claim 8, wherein said second means comprises means for producing a second plurality of signals respectively associated with each group and each of which is representative of whether or not all the binary signals of its associated group correspond to said first binary state.

10. An arrangement according to claim 8, wherein said first means comprises means for encoding said first plurality of signals as a first group identification signal representative of which of said groups contains said first occurrence of said first prescribed binary signal.

11. An arrangement according to claim 9, wherein said second means comprises means for encoding said second plurality of signals as a second group identification signal representative of which of said groups contains said first occurrence of said second prescribed binary signal.

12. An arrangement according to claim 10, wherein said first means further comprises means, responsive to said first group identification signal, for locating the position of said first occurrence of said first prescribed binary signal within the group identified by said first group identification signal and producing a first position identification signal representative thereof.

13. An arrangement according to claim 9, wherein said first means comprises means for encoding said first plurality of signals as a first group identification signal representative of which of said groups contains said first occurrence of said first prescribed binary signal.

14. An arrangement according to claim 13, wherein said second means comprises means for encoding said second plurality of signals as a second group identification signal representative of which of said groups contains said first occurrence of said second prescribed binary signal.

15. An arrangement according to claim 14, wherein said first means further comprises means, responsive to said first group identification signal, for locating the position of said first occurrence of said first prescribed binary signal within the group identified by said first group identification signal and producing a first position identification signal representative thereof.

16. An arrangement according to claim 15, wherein said second means further comprises means, responsive to said first group identification signal for locating the position of said first occurrence of said second prescribed binary signal within the group identified by said first group identification signal and producing therefrom a second position identification signal representative thereof.

17. An arrangement according to claim 16, wherein said third means comprises means for comparing said first group identification signal and said first position identification signal with said second group identification signal and said second position identification signal and producing said output signal in response to the binary position in said sequence as represented by said second group and second position identification signals being more significant than the binary position in said sequence as represented by said first group and first position identification signals.

18. An arrangement according to claim 7, wherein each of said groups corresponds to a byte of binary signals and said first and second position signals respectively identify the position of said first occurrence with said first byte.

19. For use in a data processing apparatus wherein respective sequences of digital data signals representative of numerical values are to be subjected to prescribed arithmetic signal processing operations, a method of analyzing said sequences of digital data signals to detect whether a sequence corresponds to a maximum negative number, wherein said maximum negative number is defined as a number having one or more of a first prescribed digital data signal, followed by one or more of a second prescribed digital data signal, comprising the steps of:
  (a) examining the contents of a sequence of digital data signals and producing a first signal representative of the location of the first occurrence therein of a first prescribed digital data signal relative to one end of said sequence;
  (b) examining the contents of said sequence of digital data signals and producing a second signal representative of the location of the first occurrence therein of a second prescribed digital data signal relative to the opposite end of said sequence; and
  (c) producing an output signal identifying said sequence as corresponding to a maximum negative number in response to said first signal, representative of the location in said sequence of said first occurrence of said first prescribed digital data signal, having a prescribed relationship with respect to said signal, second representative of to the location in said sequence of said first occurrence of said second prescribed digital data signal.

20. A method according to claim 19, wherein a sequence of digital data signals corresponds to a prescribed sequence of binary signals, a first binary state of which is represented by said first prescribed digital data signal, and a second binary state of which is represented by said second prescribed digital data signal.

21. A method according to claim 20, wherein step (c) comprises producing said output signal in response to said first signal locating said first occurrence of said second prescribed digital data signal at a binary position in said sequence more significant than the binary position of said first occurrence of said first prescribed digital data signal in said sequence.

22. A method according to claim 21, wherein said sequence of binary signals is comprised of a sequence of groups of binary signals and wherein step (a) comprises locating which of said groups contains said first occurrence of said first prescribed binary signal and producing a first group identification signal representative thereof and locating the position of said first occurrence of said first prescribed binary signal within said which group and producing a first position identification signal representative thereof.

23. A method according to claim 22, wherein said step (b) comprises locating which of said groups contains said first occurrence of said second prescribed binary signal and producing a second group identification signal representative thereof and locating the position of the first occurrence of said second prescribed binary signal, within that group of binary signals represented by said first group identification signal, relative to said opposite end of said sequence and producing a second position identification signal representative thereof.

24. A method according to claim 23, wherein step (c) comprises comparing said first group identification signal and said first position identification signal with said second group identification signal and said second position identification signal and producing said output signal in response to the binary position in said sequence as represented by said second group and second position identification signals being more significant than the binary position in said sequence as represented by said first group and first position identification signals.

25. A method according to claim 24, wherein each of said groups corresponds to a byte of binary signals and said first and second position signals respectively identify the position of said first occurrence with said first byte.

26. A method according to claim 20, wherein said sequence of binary signals is comprised of a sequence of groups of binary signals and wherein step (a) comprises producing a first plurality of signals respectively associated with each group and each of which is representative of whether or not all the binary signals of its associated group correspond to said second binary state.

27. A method according to claim 26, wherein step (b) comprises producing a second plurality of signals respectively associated with each group and each of which is representative of whether or not all the binary signals of its associated group correspond to said first binary state.

28. A method according to claim 26, wherein step (a) comprises encoding said first plurality of signals as a first group identification signal representative of which of said groups contain said first occurrence of said first prescribed binary signal.

29. A method according to claim 27, wherein step (b) comprises encoding said second plurality of signals as a second group identification signal representative of which of said groups contains said first occurrence of said second prescribed binary signal.

30. A method according to claim 28, wherein step (a) further comprises, in response to said first group identification signal, locating the position of said first occurrence of said first prescribed binary signal within the group identified by said first group identification signal and producing a first position identification signal representative thereof.

31. A method according to claim 27, wherein step (a) comprises encoding said first plurality of signals as a first group identification signal representative of which of said groups contains said first occurrence of said first prescribed binary signal.

32. A method according to claim 31, wherein step (b) comprises encoding said second plurality of signals as a second group identification signal representative of which of said groups contains said first occurrence of said second prescribed binary signal.

33. A method according to claim 32, wherein step (a) further comprises, in response to said first group identification signal, locating the position of said first occurrence of said first prescribed binary signal within the group identified by said first group identification signal and producing a first position identification signal representative thereof.

34. A method according to claim 33, wherein step (b) further comprises, in response to said first group identification signal, locating the position of said first occurrence of said second prescribed binary signal within the group identified by said first group identification signal and producing therefrom a second position identification signal representative thereof.

35. A method according to claim 34, wherein step (c) comprises comparing said first group identification signal and said first position identification signal with said second group identification signal and said second position identification signal and producing said output signal in response to the binary position in said sequence as represented by said second group and second position identification signals being more significant than the binary position in said sequence as represented by said first group and first position identification signals.

* * * * *